Patented Sept. 15, 1953

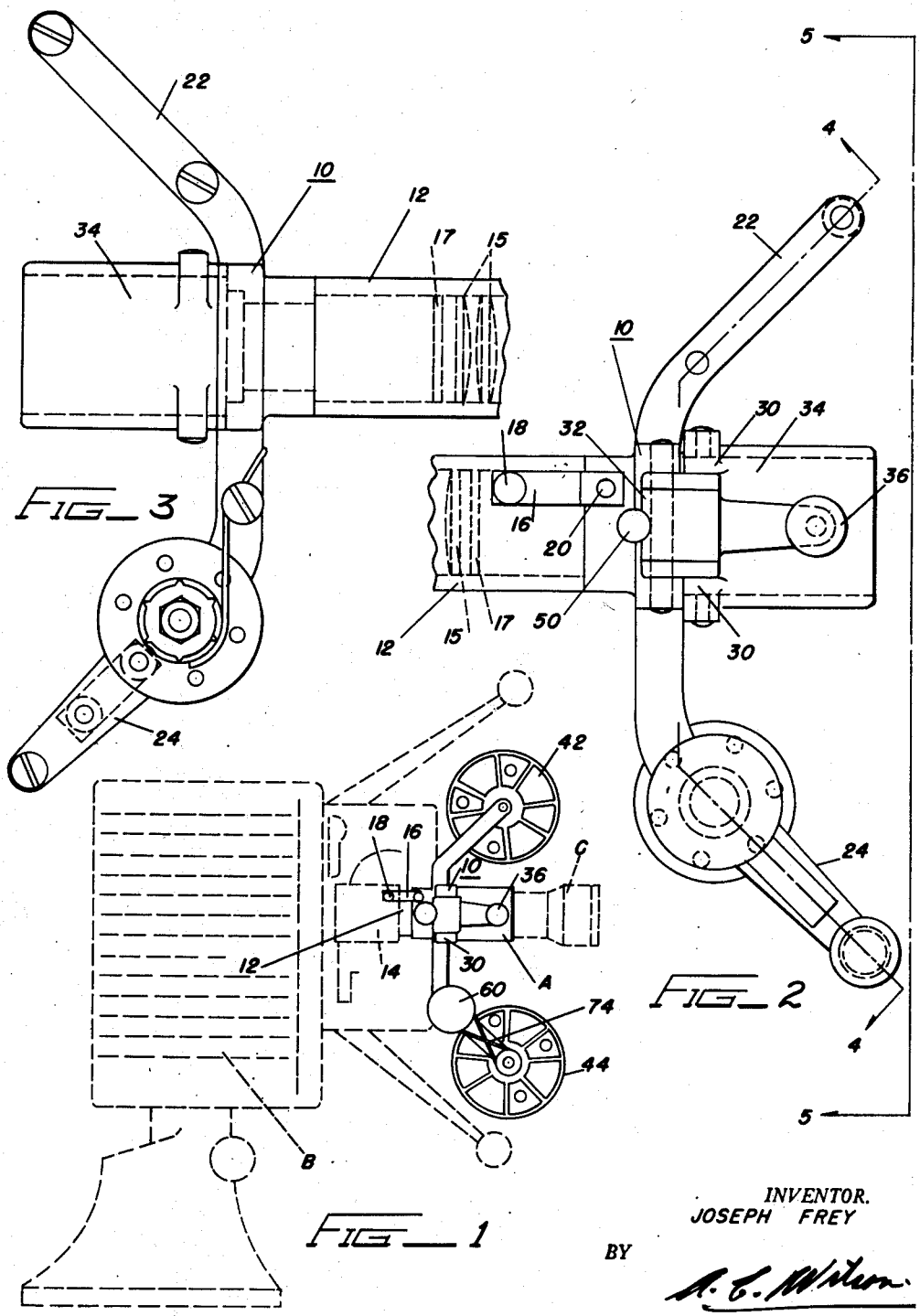

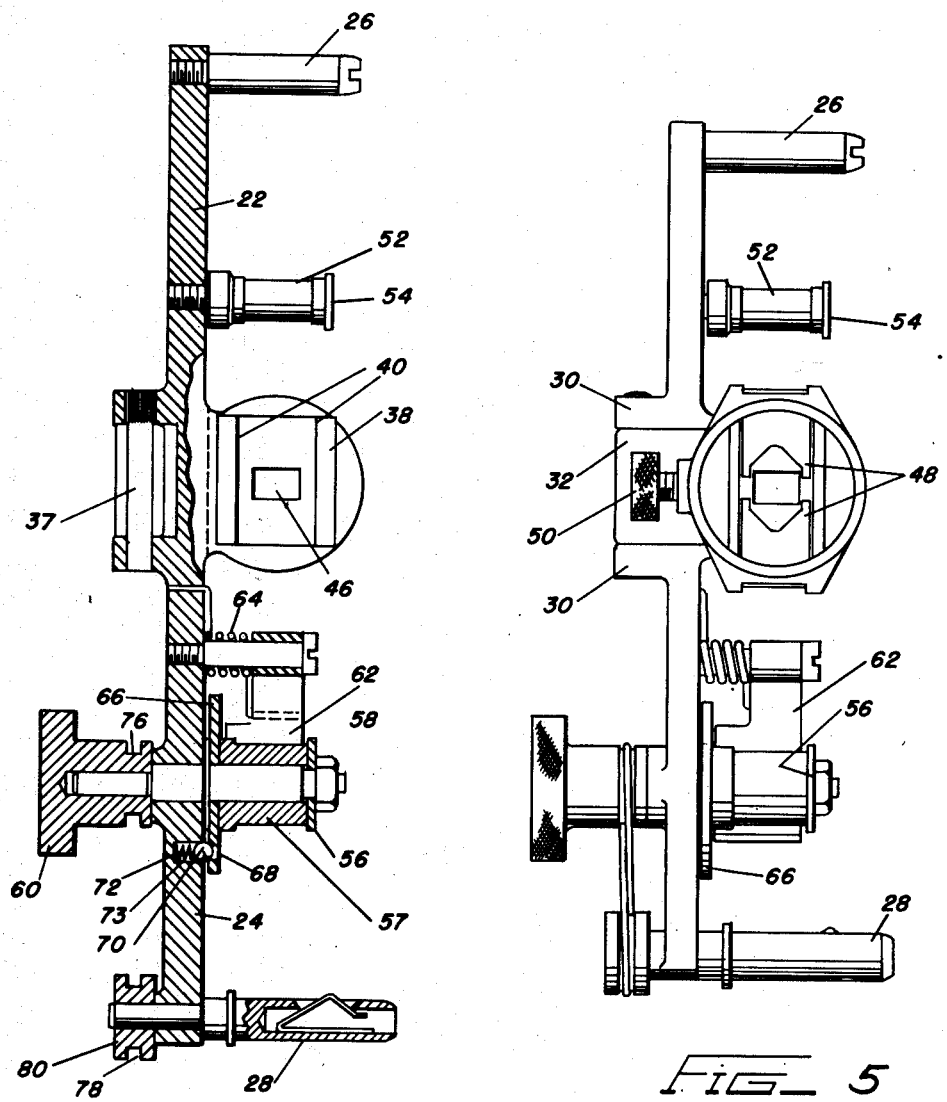

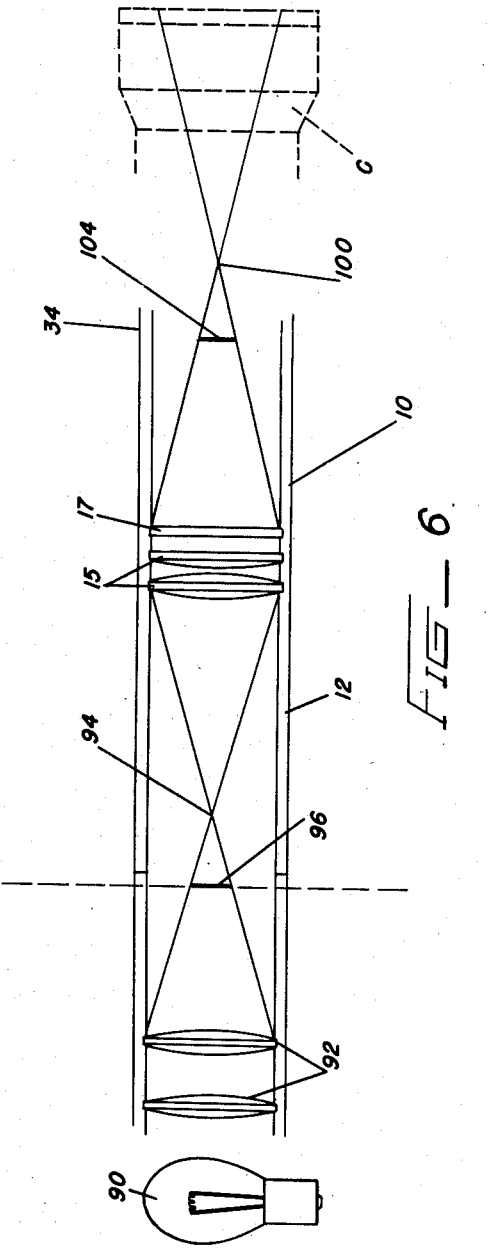

2,651,968

UNITED STATES PATENT OFFICE 2,651,968

MANUALLY ACTUATED DEVICE FOR PROJECTING SUCCESSIVELY SPACED FILM FRAMES

Joseph Frey, Dearborn, Mich., assignor to York Industries, a division of York Manufacturing Company, a partnership Application December 27, 1950, Serial No. 202,989

2 Claims. (Cl. 88—28)

This invention relates to a device for projecting successively spaced film frames on a screen in such a manner that individual frames can be viewed as long as desired.

In the operation of motion picture projectors a bright light is directed through the film to project pictures onto a screen from successively spaced film frames in such a manner as to create the illusion of motion. The light, in order to provide the desired brilliance, of necessity dissipates a large amount of heat. The film being made of celluloid or other similar material is highly inflammable.

In order to create the illusion of uninterrupted motion it is necessary that the film be propelled through the projector at a relatively rapid rate, an intermittence movement being employed to align successively spaced film frames with an aperture. It is desirable, to insure sharpness of focus, that the film be passed as close to the aperture in the aperture plate as possible, the aperture plate being positioned somewhat forwardly of the approximate apex of the light cone. A bad fire hazard is thus involved, the fact that the film is kept moving rapidly preventing it from becoming heated to its igniting temperature.

It is frequently desirable to view the picture on a single film frame for an extended period of time.

An object of this invention is to provide an attachment for motion picture projectors whereby the pictures on individual film frames can be viewed for any desired periods of time without danger of the film becoming heated to the igniting temperature.

A further object of this invention is to provide an attachment adapted to be interposed between the lens tube and a projector to space the film a sufficient distance from the light source that there is no danger of the film igniting when individual film frames are viewed for extended periods of time.

Another object of this invention resides in the provision of an attachment adapted to be mounted on any desired projector to permit viewing individual film frames, and having a manually operated member movable through a predetermined range to position successively spaced film frames in alignment with the aperture.

Yet a further object of the invention is to adapt a motion picture projector to showing "stills" whereby a large number of individual scenes may be taken and projected at remarkably low cost.

Still another object of the invention resides in the provision of an attachment for motion picture projectors adapted to be positioned in the lens receiving cylinder of the projector, and having an independent lens therein to condense light rays, and having a cylinder to receive the lens tube in such a manner that the projected pictures can be readily focused on the screen.

A further object of the invention is to provide an attachment for motion picture projectors to permit viewing individual film frames in such a manner that virtually the entire light available is so employed that there is no danger of overheating the film.

Yet another object of the invention is to provide a manual control movable through predetermined ranges of movement to accurately align successively spaced film frames with the aperture of a motion picture projector.

Another object of this invention resides in the provision of an attachment having a plurality of adapters for motion picture projectors whereby individual film frames may be successively projected.

Still a further object of this invention is to provide an adapter for projecting "stills" in a motion picture projector to space the film a sufficient distance from the light source that the danger of igniting the film is eliminated, and wherein an auxiliary condensing lens is employed to direct the projecting light through an auxiliary cycle whereby the projected images can be properly focused on the screen.

Further objects and advantages of the invention will be apparent from the following description, taken in connection with the appended drawing, in which:

Fig. 1 is a side elevational view of my improved attachment, a motion picture projector and lens tube assembly being shown in dotted lines in association therewith.

Fig. 2 is a side elevational view on an enlarged scale of my improved device.

Fig. 3 is a similar view taken from the opposite side of the attachment.

Fig. 4 is a sectional view taken substantially on the line 4—4 of Fig. 2, looking in the direction of the arrows.

Fig. 5 is an elevational view taken substantially on the line 5—5 of Fig. 2, looking in the direction of the arrows.

Fig. 6 is a schematic view illustrating the disposition of lenses in the projector and in my improved attachment.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1 it will be noted that my improved attachment A, illustrated in full lines is adapted to be secured in a motion picture projector B shown in dotted lines, and receives the lens tube assembly C of the projector also shown in dotted lines.

My improved attachment has a body section 10 having at one end an adapter in the form of a hollow cylindrical projection 12 adapted to extend into the lens tube receiving cylinder 14 of the projector B and be clamped therein by means of a screw projecting through a strap 16 and having a knurled actuating head 18. The cylindrical projection 12 has a series of condenser lenses 15 and an insulating lens such for example as a Pyrex disk 17. Cylindrical projections 12 of different diameters may be secured to the body section 10 in any desired manner as by means of a set screw 20 to adapt the attachment to projectors of different sizes.

The body member 10 has angularly related upwardly and downwardly extending arms 22 and 24 having film reel receiving spindles 26 and 28 respectively. The body member 10 also has a pair of spaced bosses 30 adapted to receive therebetween a flange 32 of a hollow lens tube receiving cylinder 34. The cylinder 34 has a screw provided with a knurled actuating head 36 whereby the screw may be projected into a spiral groove in a lens tube to permit focusing the lens by rotating the lens assembly in the cylinder 34.

The lens tube receiving cylinder 34 is hingedly mounted in the body member 10 by a shaft 37 extending through the bosses 30 of the body member and the flange 32 of the cylinder 34.

The body member 10 is provided in its forward face 38 with a pair of spaced film guides 40 adapted to guide film as it moves from an upper supply reel 42 mounted on the spindle 26 of the arm 22 to a lower receiving reel 44 mounted on the spindle 28 of the arm 24. The forward face 38 of the body member 10 is provided with a rectangular shaped aperture 46 adapted to align with the marginal edges of successively spaced frames of film as it passes from the upper reel 42 to the lower reel 44. The rear face of the lens tube receiving cylinder 34 is provided with spaced springs 48 to yieldingly urge the film into contact with the front face 38 of the member 10 having the aperture 46 therein.

The flange 32 of the lens tube receiving member 34 is extended axially of the lens receiving bore therein to receive a screw having a knurled actuating knob 50 whereby the inner end of the screw may be projected into contact with the side face of the body member 10 to hold the member 34 in the closed or film projecting position with reference to the body member 10.

A guide roller 52 rotatably mounted on a spindle 54 secured in the arm 22 is employed to direct the film from the reel 42 to induce it to move into the space between the body member 10 and the cylinder 34 parallel with the guides 40.

A film propelling sprocket 56 is secured to a shaft 58 journalled in the arm 24 and provided with a knurled actuating knob 60. The reel 56 is provided with film engaging teeth in the usual manner, a spacer 57 being employed to hold the sprocket 56 in proper position. A guide 62 urged by a spring 64 is employed to yieldingly hold the apertures of the film in driving relation with the film driving teeth of the sprocket 56.

Means are provided to shift the film the distance of one film frame each time the actuating knob 60 is moved through one cycle of operation. One illustrative example of such film movement control means comprises a disk 66 having a series of equally spaced apertures 68. These apertures are spaced apart a distance such that when a ball 70 yieldingly urged by a spring 72 seated in a blind hole 73 shifts from one aperture 68 to the next, the sprocket 56 shifts the film a distance equal to one film frame.

A film takeup mechanism in the form of a resilient driving member 74 such as a rubber or spring band may engage in grooves 76 and 78 formed in the actuating knob 60 and in a wheel 80 secured to the spindle 28 to rotate the reel 44 to maintain the film thereon tight.

The operation is as follows. The lens tube assembly C is removed from the projector B, and the cylindrical projection 12 of the attachment A is positioned in the lens tube receiving aperture of the projector B. The attachment A is locked in place by tightening the knurled screw 18. The lens tube assembly C is then positioned in the cylinder 34, the knurled actuating member 36 being actuated to project its associated screw into the spiral groove to permit focusing the pictures projected from the spaced frames by rotating the lens tube therein.

The actuating knob 50 is then released to permit the lens tube receiving member 34 to be rotated about shaft 37. The reel 42 having film wrapped thereon is positioned on the spindle 26. The end of the film is passed over guide roller 52 and laid between the guides 40 in the front face 38 of the body member 10. The spring pressed guide 62 is pushed away from the sprocket 56, and the film is threaded on the sprocket with a film frame aligned with the aperture 46 in the front face of the body member 10. The end of the film is threaded onto the film receiving reel 44.

The projector may then be started and an individual film frame may be viewed as long as desired. When another film frame is to be viewed the actuating knob 60 is operated to align the next successive film frame with the aperture 46 in the body member 10.

The plane of contact of the film with the aperture 46 having been spaced farther from the light source the danger of the film becoming heated to the igniting temperature is eliminated.

Referring to Fig. 6 it will be noted that a light source is illustrated diagrammatically at 90, a series of condenser lenses 92 being employed in the projector to bend the light rays and direct them toward an apex 94. In the operation of motion picture projectors, the film is passed through the light beam at approximately the point 96. The adapter tube 12 of my attachment A is positioned in the lens receiving tube of the projector B with its condenser lenses 15 positioned to again collect the light after it has been diffused to approximately the full diameter of the cylinder 12 and again condense them and direct them toward a second apex 100. The heat insulating disk 17 of transparent material such as Pyrex positioned in the cylinder 12 of the attachment A retards the flow of heat from the light source toward the aperture plate and film. The forward face 38 of the body member 10 having the aperture 46 therein is preferably positioned at approximately at the point 104 between the second apex 100 and the condenser lenses 15. The lens tube C is positioned in the cylinder 34 and is movable fore and aft therein to focus the projected images on the screen.

While the invention has been illustrated with particular reference to an illustrative embodiment thereof it will be apparent that various modifications therein may be made without departing from the spirit of the invention.

I claim:

1. An attachment for a motion picture projector to permit prolonged viewing of individual film frames comprising a member having a projection aperture therein, oppositely extending arms carried by said member and having film reel carrying spindles, a lens tube receiving cylinder hingedly mounted on said member and adapted to receive a projector lens tube in focusing relation relative to the aperture in said member, film guiding means to direct film between said aperture carrying member and said lens tube receiving cylinder from a reel carried by one of said film reel carrying spindles to a reel carried by the other of said film reel carrying spindles, yielding means between said member and the lens tube receiving cylinder to yieldingly urge film to a predetermined position relative to the projection aperture, motion transmitting means to shift film to align successively spaced film frames with the aperture in said member, said motion transmitting means comprising a rotatable disk having a series of equally spaced indentations, a detent adapted to successively engage said indentations and so related to the spacing of the indentations in the disk that when the disk is rotated to shift the detent from one adjacently disposed indentation to another the adjacently disposed film frames are successively aligned with the projection aperture in said member, and a knob to actuate said motion transmitting means and disk.

2. An attachment for a motion picture projector to permit prolonged viewing of individual film frames comprising a member having a projection aperture therein, oppositely extending arms carried by said member and having film reel carrying spindles, a lens tube receiving cylinder movably mounted on said member and adapted to receive a lens tube in focusing relation relative to the aperture in said member, film guiding means to direct film between said aperture carrying member and said lens tube receiving cylinder from a reel carried by the other of said film reel carrying spindles, yielding means between said member and the lens tube receiving cylinder to yieldingly urge film to a predetermined position relative to the projection aperture, motion transmitting means to shift film to align successively spaced film frames with the aperture in said member, said motion transmitting means comprising a disk having a series of equally spaced indentations, a detent adapted to successively engage said indentations and so related to the spacing of the indentations in the disk that when the disk is rotated to shift the detent from one adjacently disposed indentation to another the adjacently disposed film frames are successively aligned with the projection aperture in said member, and a knob to actuate said motion transmitting means and disk.

JOSEPH FREY.

References Cited in the file of this patent

UNITED STATES PATENTS

| Number | Name | Date |
|---|---|---|
| 1,700,656 | Tillyer | Jan. 29, 1929 |
| 1,738,762 | De Vault | Dec. 10, 1929 |
| 2,033,038 | Lee | Mar. 3, 1936 |
| 2,243,160 | Koehl | May 27, 1941 |
| 2,251,077 | Stanton | July 29, 1941 |
| 2,438,333 | Dickman | Mar. 23, 1948 |
| 2,452,745 | Getter | Nov. 2, 1948 |

FOREIGN PATENTS

| Number | Country | Date |
|---|---|---|
| 333,089 | Great Britain | Aug. 7, 1930 |
| 847,038 | France | June 19, 1939 |